(12) United States Patent
Liao et al.

(10) Patent No.: US 11,997,476 B2
(45) Date of Patent: May 28, 2024

(54) SYSTEMS, METHODS, AND DEVICES FOR PRIVACY AND CONTROL OF TRAFFIC ACCESSING PLMN SERVICE AT A NON-PUBLIC NETWORK

(71) Applicant: Apple Inc., Cupertino, CA (US)

(72) Inventors: Ching-Yu Liao, Portland, OR (US); Abhijeet Kolekar, Hillsboro, OR (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 18/467,352

(22) Filed: Sep. 14, 2023

(65) Prior Publication Data

US 2024/0007850 A1 Jan. 4, 2024

Related U.S. Application Data

(62) Division of application No. 17/288,843, filed as application No. PCT/US2019/058176 on Oct. 25, 2019, now Pat. No. 11,832,096.

(60) Provisional application No. 62/757,035, filed on Nov. 7, 2018, provisional application No. 62/755,044, filed on Nov. 2, 2018.

(51) Int. Cl.
| | |
|---|---|
| *H04W 12/02* | (2009.01) |
| *H04L 67/14* | (2022.01) |
| *H04W 12/06* | (2021.01) |
| *H04W 12/80* | (2021.01) |
| *H04W 28/086* | (2023.01) |
| *H04W 84/04* | (2009.01) |

(52) U.S. Cl.
CPC .............. *H04W 12/02* (2013.01); *H04L 67/14* (2013.01); *H04W 12/06* (2013.01); *H04W 28/086* (2023.05); *H04W 12/80* (2021.01); *H04W 84/042* (2013.01)

(58) Field of Classification Search
CPC ... H04W 12/02; H04W 12/06; H04W 28/086; H04W 12/80; H04W 84/042; H04L 67/14
See application file for complete search history.

(56) References Cited

U.S. PATENT DOCUMENTS

| | | | |
|---|---|---|---|
| 2014/0022904 A1* | 1/2014 | Ahmad | .................... H04L 47/10 370/235 |
| 2018/0317157 A1 | 11/2018 | Baek et al. | |
| 2019/0158408 A1 | 5/2019 | Li et al. | |
| 2019/0394833 A1 | 12/2019 | Talebi Fard et al. | |
| 2020/0053622 A1* | 2/2020 | Huang-Fu | .............. H04W 36/14 |

FOREIGN PATENT DOCUMENTS

| | | |
|---|---|---|
| WO | 2018128458 A1 | 7/2018 |
| WO | 2018140384 A1 | 8/2018 |

OTHER PUBLICATIONS

U.S. Appl. No. 17/288,843 , Notice of Allowance, Aug. 30, 2023, 9 pages.
Huawei, Hisilicon, Ericsson,, Sharp , "LADN indication from UE at registration", C1-185314, 3GPP TSG-CT WG1 Meeting #112, West Palm Beach, FL (USA), (was C1-184924), 14 pages.

(Continued)

*Primary Examiner* — Brandon J Miller
(74) *Attorney, Agent, or Firm* — Dorsey & Whitney LLP

(57) ABSTRACT

Systems and methods are provided to control traffic accessing a public land mobile network service (PLMN) at a non-public network to perform local breakout for selected traffic.

19 Claims, 13 Drawing Sheets

(56) References Cited

OTHER PUBLICATIONS

PCT/US2019/058176, International Search Report and Written Opinion, Feb. 28, 2020 00:00:00.0, 10 pages.
SAMSUNG, "Solution for Interworking between a non-pubic and a public network", S2-1810642, SA WG2 Meeting #129, Dongguan, China, Agenda Item 6.15.3, 4 pages.
VIVO, "Solution for accessing to Non Public Network services via PLMN", S2-1810200, SA WG2 Meeting #129, Dongguan, P. R. China, Agenda Item 6.15, 6 pages.
ZTE, "Evaluation on Combined establishment procedure and Separated establishment procedure", S2-1810652, SA WG2 Meeting #129, Sophia Antipolis, France, Agenda Item 6.8 (revision of S2-18), Oct. 9, 2018 00:00:00.0, 9 pages.

* cited by examiner

SYSTEMS, METHODS, AND DEVICES FOR PRIVACY AND CONTROL OF TRAFFIC ACCESSING PLMN SERVICE AT A NON-PUBLIC NETWORK

CROSS-REFERENCE TO RELATED APPLICATIONS

This application is a continuation of U.S. patent application Ser. No. 17/288,843, filed Apr. 26, 2021, which is a national stage application filed under 35 U.S.C. § 371 of International Patent Application No. PCT/US2019/058176, filed Oct. 25, 2019, which claims the benefit of U.S. Provisional Application No. 62/755,044, filed Nov. 2, 2018 and U.S. Provisional Application No. 62/757,035, filed Nov. 7, 2018, each of which is hereby incorporated by reference herein in its entirety.

TECHNICAL FIELD

This application relates generally to wireless communication systems, and more specifically to public land mobile network (PLMN) services at a non-public network.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Embodiments herein provide privacy when using PLMN services for a UE accessing a non-public network in a 5G System. Certain embodiments re-use some of system features including a protocol data unit (PDU) session anchor concept (see, e.g., 3GPP TS 23.501) and/or non-public network support (see, e.g., 3GPP TR 734). When allowing the UE to use the PLMN services via accessing the non-public network, there is a potential privacy breach of some traffic transport via PLMN, there is potential latency due to traffic transport via PLMN that may fail to meet the required quality of service (QoS), and/or there are potential expenses to transport traffic via the PLMN. Thus, various embodiments herein provide a method to perform local breakout at a non-public network for some traffic, criteria to determine if and when to enable local breakout, a method to configure the UE to enable the local breakout at the non-public network, and a method to encrypt traffic for privacy when transporting via PLMN from the non-public network.

Figure 1:
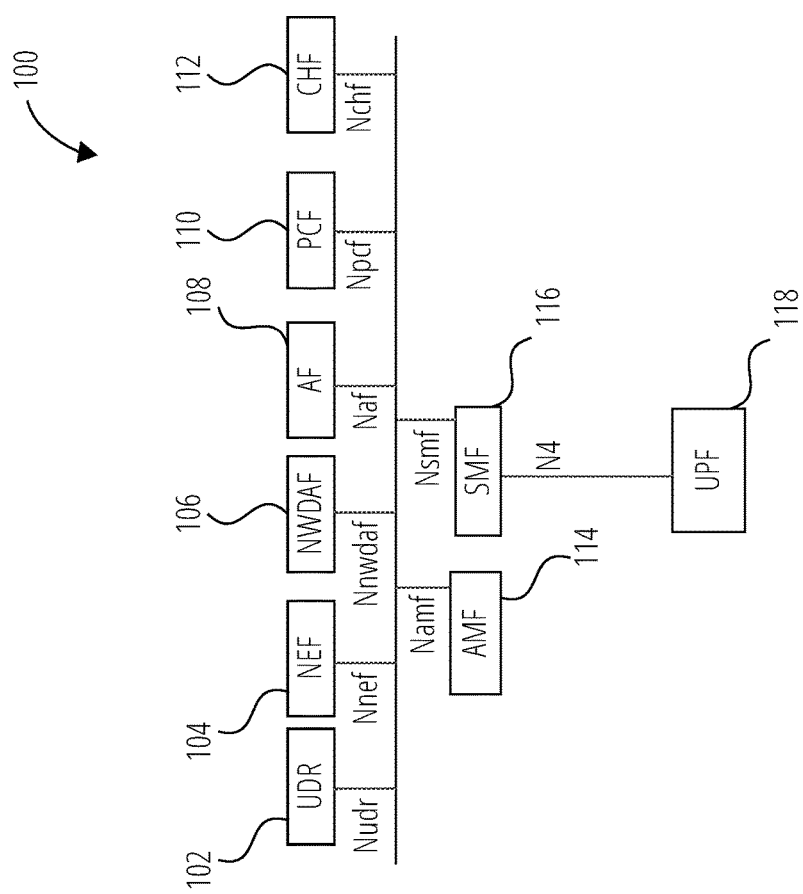
FIG. 1 illustrates a service based representation of an overall architecture for a policy and charging control framework in accordance with one embodiment.

FIG. 1 illustrates a service based representation 100 of an overall architecture for a policy and charging control framework for a 5G system (5GS) according to one embodiment. As described in 3GPP TS 23.503, the service based representation 100 comprises the functions of the Policy Control Function (shown as PCF 110), the Session Management Function (shown as SMF 116), the User Plane Function (shown as UPF 118), the Access and Mobility Management Function (shown as AMF 114), the Network Exposure Functionality (shown as NEF 104), the Network Data Analytics Function (shown as NWDAF 106), the Charging Function (shown as CHF 112), the Application Function (shown as AF 108) and a Unified Data Repository (shown as UDR 102). FIG. 1 also shows the corresponding interfaces including Nudr, Nnef, Nnwdaf, Naf, Npcf, Nchf, Namf, and Nsmf. An N4 reference point may not be part of the 5G policy framework, but is shown for completeness.

Figure 2:
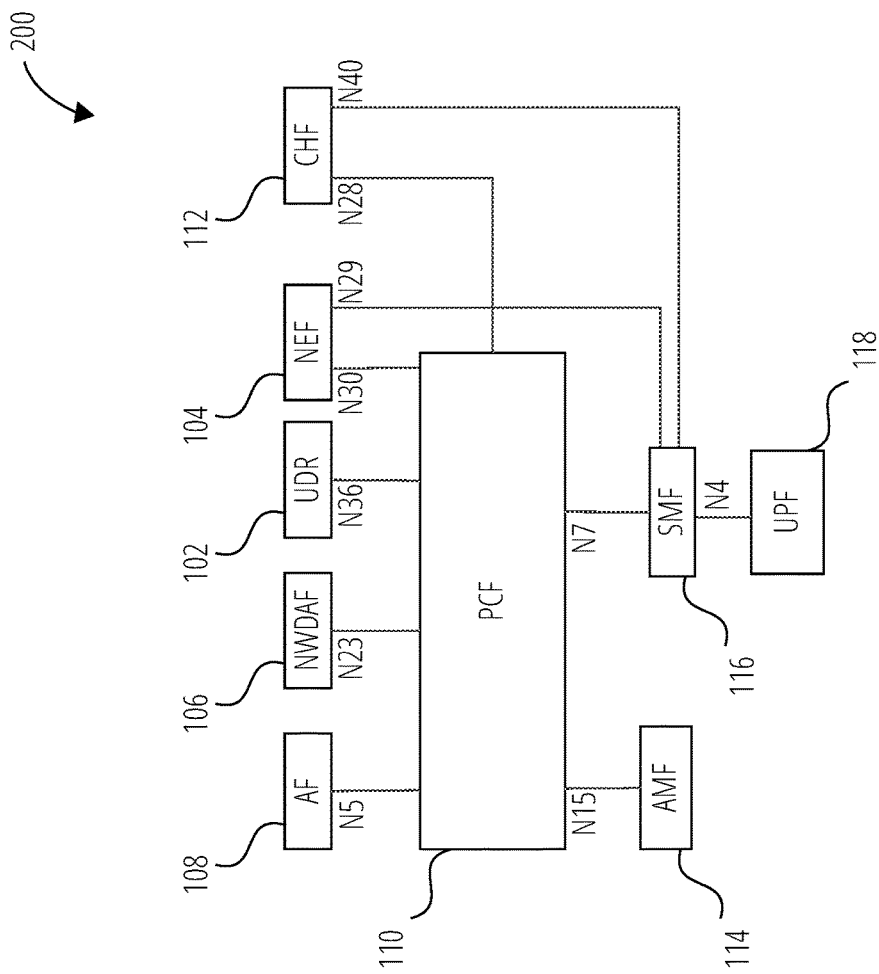
FIG. 2 illustrates a reference point representation of an overall architecture for a policy and charging control framework in accordance with one embodiment.

FIG. 2 illustrates a reference point representation 200 of an overall architecture for a policy and charging control framework for 5GS according to one embodiment. As described in 3GPP TS 23.503, the reference point representation 200 comprises the functions of the PCF 110, the SMF 116, the UPF 118, the AMF 114, the NEF 104, the as NWDAF 106, the CHF 112, the AF 108 and the UDR 102. FIG. 2 also shows the corresponding reference points N5, N23, N36, N30, N29, N28, N40, N15, N7, and N4. The N4 reference point may not be part of the 5G policy framework, but is shown for completeness.

Figure 3:
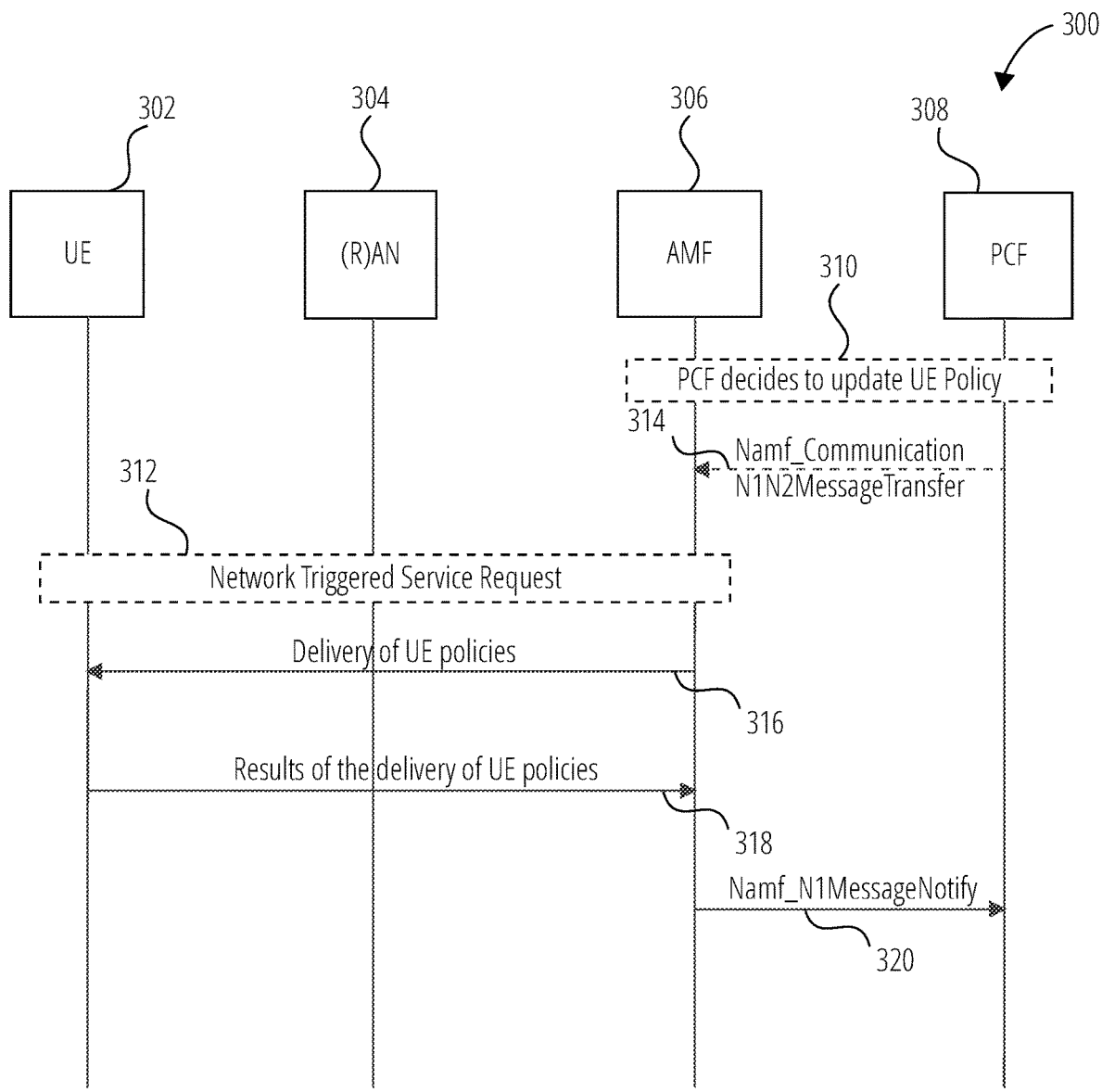
FIG. 3 illustrates a UE configuration update procedure in accordance with one embodiment.

In certain embodiments, a UE policy may be delivered from a PCF to a UE by using a UE configuration update procedure. For example, FIG. 3 illustrates an example UE configuration update procedure 300 according to one embodiment. The UE configuration update procedure 300 includes cooperation between a UE 302, a RAN or other access network (shown as (R)AN 304), an access and mobility management function (shown as AMF 306), and a policy control function (shown as PCF 308). The UE configuration update procedure 300 is initiated when the PCF 308 decides to update UE policy 310. The PCF 308 may decide to update the UE 302 access selection and protocol data unit (PDU) session selection related policy information (i.e., UE policy) in the UE configuration. In the non-roaming case, the visited PCF (V-PCF) is not involved and the role of the home PCF (H-PCF) is performed by the PCF. For the roaming scenarios, the V-PCF interacts with the AMF 306 and the H-PCF interacts with the V-PCF. The PCF 308 may decide to update the UE policy procedures based on triggering conditions such as an initial registration, registration with 5G system (5GS) when the UE moves from evolved packet system (EPS) to 5GS, or updates UE policy.

For example, for the case of initial registration and registration with 5GS when the UE 302 moves from EPS to 5GS, the PCF 308 compares the list of public service identifiers (PSIs) included in the UE access selection and PDU session selection related policy information in Npcf_UEPolicyControl_Create request and determines whether UE access selection and PDU session selection related policy information are to be updated and provided to the UE 302 via the AMF 306 using a DL NAS TRANSPORT message. As another example, for the network triggered UE policy update case (e.g., the change of UE location, the change of subscribed single network slice selection assistance information (S-NSSAI) as described in clause 6.1.2.2.2 of 3GPP TS 23.503), the PCF 308 checks the latest list of PSIs to decide which UE access selection and/or PDU session selection related policies to send to the UE 302.

The PCF 308 may check if the size of the resulting UE access selection and PDU session selection related policy information exceeds a predefined limit. If the size is under the limit, then UE access selection and PDU session selection related policy information are included in a single Namf_Communication_N1N2MessageTransfer service operation 314 as described below. If the size exceeds the predefined limit, the PCF 308 splits the UE access selection and PDU session selection related policy information in smaller, logically independent UE access selection and PDU session selection related policy information ensuring the size of each is under the predefined limit. Each UE access selection and PDU session selection related policy information may then be sent in a separate Namf_Communication_N1N2MessageTransfer service operation 314 as described below.

The NAS messages from the AMF 306 to the UE 302 may not exceed the maximum size limit allowed in NG-RAN (PDCP layer), so the predefined size limit in PCF 308 may be related to that limitation. The mechanism used to split the UE access selection and PDU session selection related policy information is described in 3GPP TS 29.507.

The PCF 308 invokes the Namf_Communication_N1N2MessageTransfer service operation 314 provided by the AMF 306. The message may include SUPI and a UE policy container.

In a network triggered service request 312, if the UE 302 is registered and reachable by the AMF 306 in either 3GPP access or non-3GPP access, the AMF 306 transfers transparently the UE policy container to the UE 302 via the registered and reachable access. If the UE 302 is registered in both 3GPP and non-3GPP accesses and reachable on both access and served by the same AMF 306, the AMF 306 transfers transparently the UE policy container to the UE 302 via one of the accesses based on the AMF local policy. If the UE 302 is not reachable by AMF over both 3GPP access and non-3GPP access, the AMF 306 reports to the PCF 308 that the UE policy container could not be delivered to the UE 302 using Namf_Communication_N1N2TransferFailureNotification.

If the AMF 306 decides to transfer transparently the UE policy container to the UE 302 via 3GPP access, e.g. the UE 302 is registered and reachable by AMF in 3GPP access only, or if the UE 302 is registered and reachable by AMF in both 3GPP and non-3GPP accesses served by the same AMF and the AMF 306 decides to transfer transparently the UE policy container to the UE 302 via 3GPP access based on local policy, and the UE 302 is in CM-IDLE and reachable by AMF in 3GPP access, the AMF 306 starts the paging procedure by sending a paging message. Upon reception of paging request, the UE 302 may initiate a UE triggered service request procedure.

In a delivery 316 of UE policies, if the UE 302 is in CM-CONNECTED over 3GPP access or non-3GPP access, the AMF 306 transfers transparently the UE policy container (UE access selection and PDU session selection related policy information) received from the PCF 308 to the UE 302. The UE policy container may include the list of policy sections as described in 3GPP TS 23.503. The UE 302 updates the UE policy provided by the PCF 308 and sends the results 318 of the delivery of UE policies to the AMF 306.

If the AMF 306 received the UE policy container and the PCF 308 subscribed to be notified of the reception of the UE policy container then the AMF 306 forwards the response of the UE 302 to the PCF 308 using a Namf_N1MessageNotify operation 320. The PCF 308 maintains the latest list of PSIs delivered to the UE 302 and updates the latest list of PSIs in the UDR by invoking Nudr_DM_Update (SUPI, Policy Data, Policy Set Entry, updated PSI data) service operation.

Figure 4:
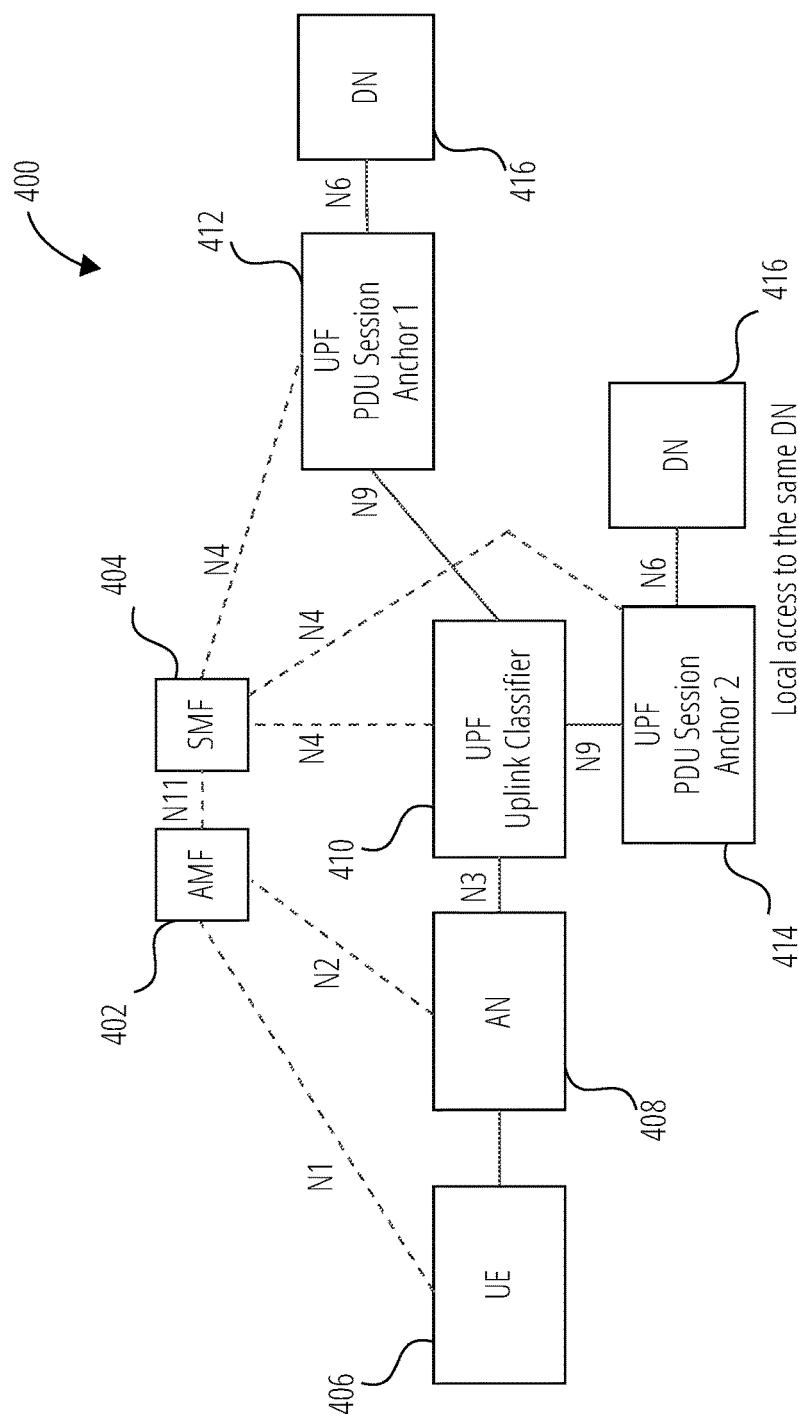
FIG. 4 illustrates an architecture in accordance with one embodiment.

FIG. 4 illustrates a user plane architecture 400 for an uplink classifier according to one embodiment. See, e.g., 3GPP TS 23.501, section 5.6.4.2. The architecture 400 includes an AMF 402, an SMF 404, a UE 406, an access network (shown as AN 408), a UPF 410 supporting an uplink classifier (UL CL) functionality, a UPF 412 comprising a PDU session anchor 1, a UPF 414 comprising a PDU session anchor 2, and a data network (shown as DN 416). FIG. 4 illustrates how the SMF 404 mays use the UPF 410 as an UL CL to steer traffic flows towards two or more UPFs (e.g., the UPF 412 and the UPF 414) as PDU anchors in a PDU session toward the same DN 416 identified by a data network name (DNN). Corresponding reference points N1, N2, N3, N4, N6, N9, and N11 are also shown.

In certain embodiments (e.g., in the case of PDU sessions of type IPv4 or IPv6 or IPv4v6 or Ethernet), the SMF 404 may decide to insert in the UL CL in the data path of a PDU session. The UL CL is a functionality supported by the UPF 410 that diverts (locally) some traffic matching traffic filters provided by the SMF 404. The insertion and removal of the UL CL is decided by the SMF 404 and controlled by the SMF 404 using generic N4 and UPF capabilities. The SMF 404 may decide to insert in the data path of a PDU session the UPF 410 supporting the UL CL functionality during or after the PDU session establishment, or to remove from the data path of a PDU session UPF 410 supporting the UL CL functionality after the PDU session establishment. The SMF 404 may include more than one UPF supporting the UL CL functionality in the data path of a PDU session. The UE 406 may be unaware of the traffic diversion by the UL CL, and may not be involved in both the insertion and the removal of UL CL. In the case of a PDU Session of IPv4 or IPv6 or IPv4v6 type, the UE 406 associates the PDU session with either a single IPv4 address or a single IPv6 Prefix or both of them allocated by the network.

When an UL CL functionality has been inserted in the data path of a PDU session, there may be multiple PDU session anchors for the PDU session. For example, the PDU session anchors of the UPF 412 and the UPF 414 provide different access to the same DN 416. In the case of a PDU session of IPv4 or IPv6 or IPv4v6 type, only one PDU session anchor is the IP anchor point for the IPv4 address and/or IPv6 prefix of the PDU session provided to the UE 406. The UL CL provides forwarding of UL traffic towards different PDU session anchors and merge of DL traffic to the UE 406 (i.e., merging the traffic from the different PDU session anchors on the link towards the UE 406). This may be based on traffic detection and traffic forwarding rules provided by the SMF 404 The UL CL applies filtering rules (e.g., to examine the destination IP address/prefix of UL IP packets sent by the UE 406) and determines how the packet should be routed. The UPF 410 supporting an UL CL may also be controlled by the SMF 404 to support traffic measurement for charging, traffic replication for LI, and bit rate enforcement (session-aggregate maximum bit rate (AMBR) per PDU session). When an N9 forwarding tunnel exists between a source UL CL and a target UL CL, the session-AMBR per PDU session may be enforced by the source UL CL UPF. In certain embodiments, the UPF 410 supporting the UL CL may also support a PDU session anchor for connectivity to the local access to the data network (including, e.g., support of tunneling or network address translation (NAT) on N6). This may be controlled by the SMF 404.

Additional UL CLs (and thus additional PDU session anchors) may be inserted in the data path of a PDU session to create new data paths for the same PDU session. Organization of the data path of UL CLs in a PDU session may be up to operator configuration and SMF logic and there may be only one UPF supporting UL CL connecting to the (R)AN via N3 interface, except when session continuity upon UL CL relocation is used. In certain embodiments, the UPF 410 may support both the UL CL and PDU session anchor functionalities.

Due to UE mobility, the network may need to relocate the UPF acting as UL CL and establish a new PDU session anchor (PSA) for access to the local DN. To support session continuity during UL CL relocation the network may establish a temporary N9 forwarding tunnel between the source UL CL and target UL CL. The N9 forwarding tunnel may be maintained until all active traffic flowing on it ceases to exist for a configurable period of time or until an application function (AF) informs the SMF 404 that it can release the source PSA providing access to the source local DN. During the existence of the N9 forwarding tunnel the UPF acting as target UL CL is configured with packet filters that: force uplink traffic from existing data sessions between UE and the application in the source local DN into the N9 forwarding tunnel towards the source UL CL; and/or force any traffic related to the application in the target local DN to go to the new local DN via the target PSA. The SMF 404 may send a late notification to AF to inform it about the DNAI change as described in 3GPP TS 23.502, clause 4.3.6.3. This notification can be used by the AF (e.g., to trigger mechanisms in the source local DN to redirect the ongoing traffic sessions towards an application in the target local DN). The SMF 404 can also send late notification to the target AF instance if associated with this target local DN. The procedure for session continuity upon UL CL relocation is described in 3GPP TS 23.502, clause 4.3.5.7.

Figure 5:
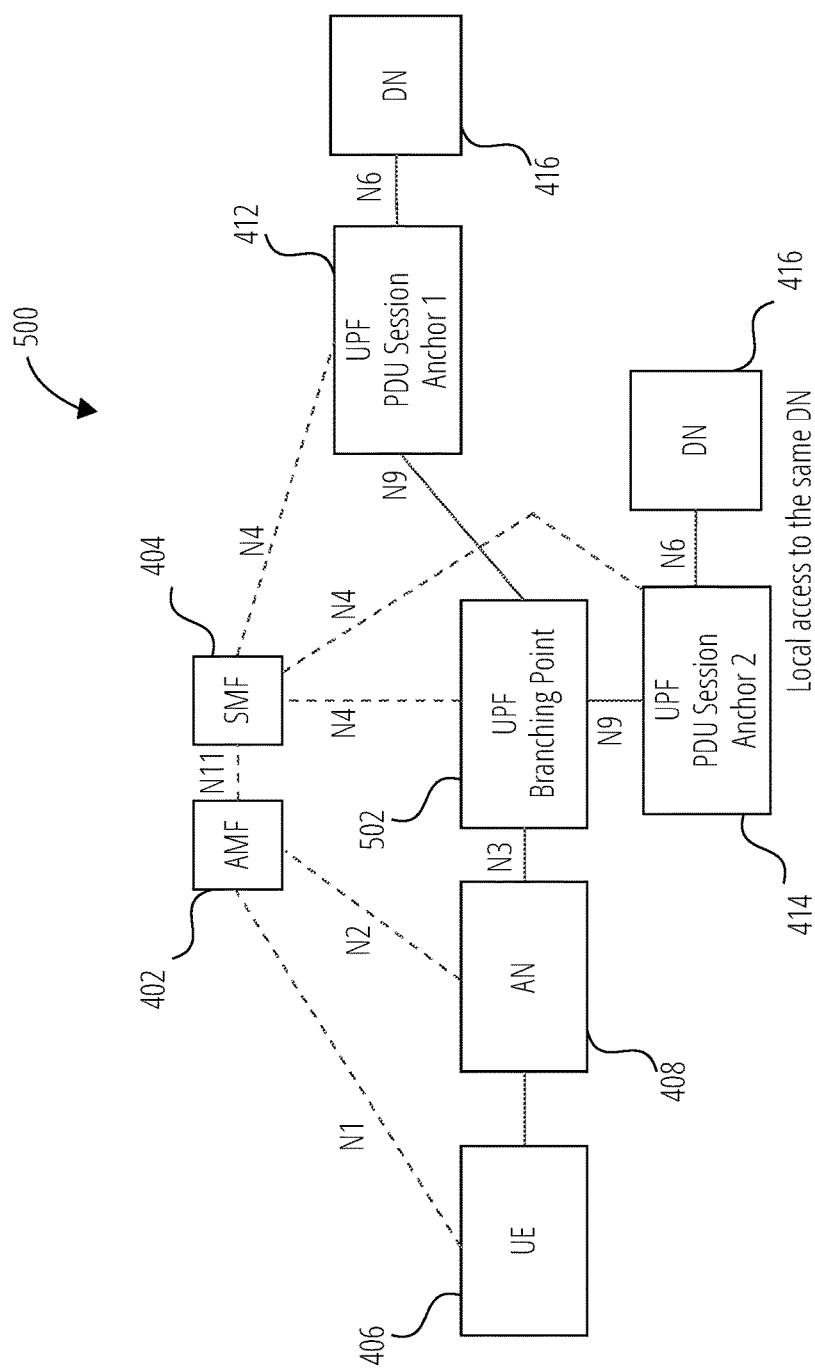
FIG. 5 illustrates an architecture in accordance with one embodiment.

FIG. 5 illustrates an architecture 500 for a multi-homed PDU session according to one embodiment. See, e.g., 3GPP TS 23.501, section 5.6.4.3. The architecture 500 includes the AMF 402, the SMF 404, the UE 406, the AN 408, the UPF 412, the UPF 414, the DN 416, and the corresponding reference points shown in FIG. 4. The architecture 500 also includes a UPF 502 configured to support a branching point functionality. FIG. 5 illustrates how the SMF 404 may use the UPF 502 as a branching point to steer traffic flows towards two or more UPFs (e.g., the UPF 412 and the UPF 414) as PDU session anchors in a PDU session towards the same DN 416 identified by a DNN.

A PDU session may be associated with multiple IPv6 prefixes, which may be referred to as a multi-homed PDU session. The multi-homed PDU session provides access to the DN 416 via more than one PDU session anchor. The different user plane paths leading to the different PDU session anchors branch out at a "common" UPF referred to as the UPF 502 supporting "Branching Point" functionality. The Branching Point provides forwarding of UL traffic towards the different PDU session anchors and merge of DL traffic to the UE 406 (i.e., merging the traffic from the different PDU session anchors on the link towards the UE). The UPF 502 supporting a Branching Point functionality may also be controlled by the SMF 404 to support traffic measurement for charging, traffic replication for LI and bit rate enforcement (session-AMBR per PDU session). The insertion and removal of the UPF 502 supporting Branching Point is decided by the SMF 404 and controlled by the SMF 404 using generic N4 and UPF capabilities. The SMF 404 may decide to insert in the data path of a PDU session the UPF 502 supporting the Branching Point functionality during or after the PDU session establishment, or to remove from the data path of a PDU session a UPF supporting the Branching Point functionality after the PDU session establishment.

In certain embodiments, multi homing of a PDU session applies only for PDU sessions of IPv6 type. When the UE 406 requests a PDU session of type "IPv4v6" or "IPv6" the UE 406 also provides an indication to the network whether it supports a multi-homed IPv6 PDU session. The use of multiple IPv6 prefixes in a PDU session may be characterized by: the UPF 502 supporting a Branching Point functionality is configured by the SMF 404 to spread the UL traffic between the IP anchors based on the source prefix of the PDU (which may be selected by the UE 406 based on routing information and preferences received from the network); Internet Engineering Task Force (IETF) request for comments (RFC) 4191 may be used to configure routing information and preferences into the UE 406 to influence the selection of the source prefix (note that this may correspond to Scenario 1 defined in IETF RFC 7157, which allows to make the Branching Point unaware of the routing tables in the data network and to keep the first hop router function in the IP anchors); the multi-homed PDU session may also be used to support cases where UE 406 accesses both a local service (e.g., local server) and a central service (e.g., the internet); and/or the UE 406 may use the method specified in 3GPP TS 23.502, clause 4.3.5.3 to determine if a multi-homed PDU session is used to support the service continuity case, or if it is used to support the local access to DN case. In some embodiments, it is possible for a given UPF to support both the Branching Point and the PDU session anchor functionalities.

Figure 6:
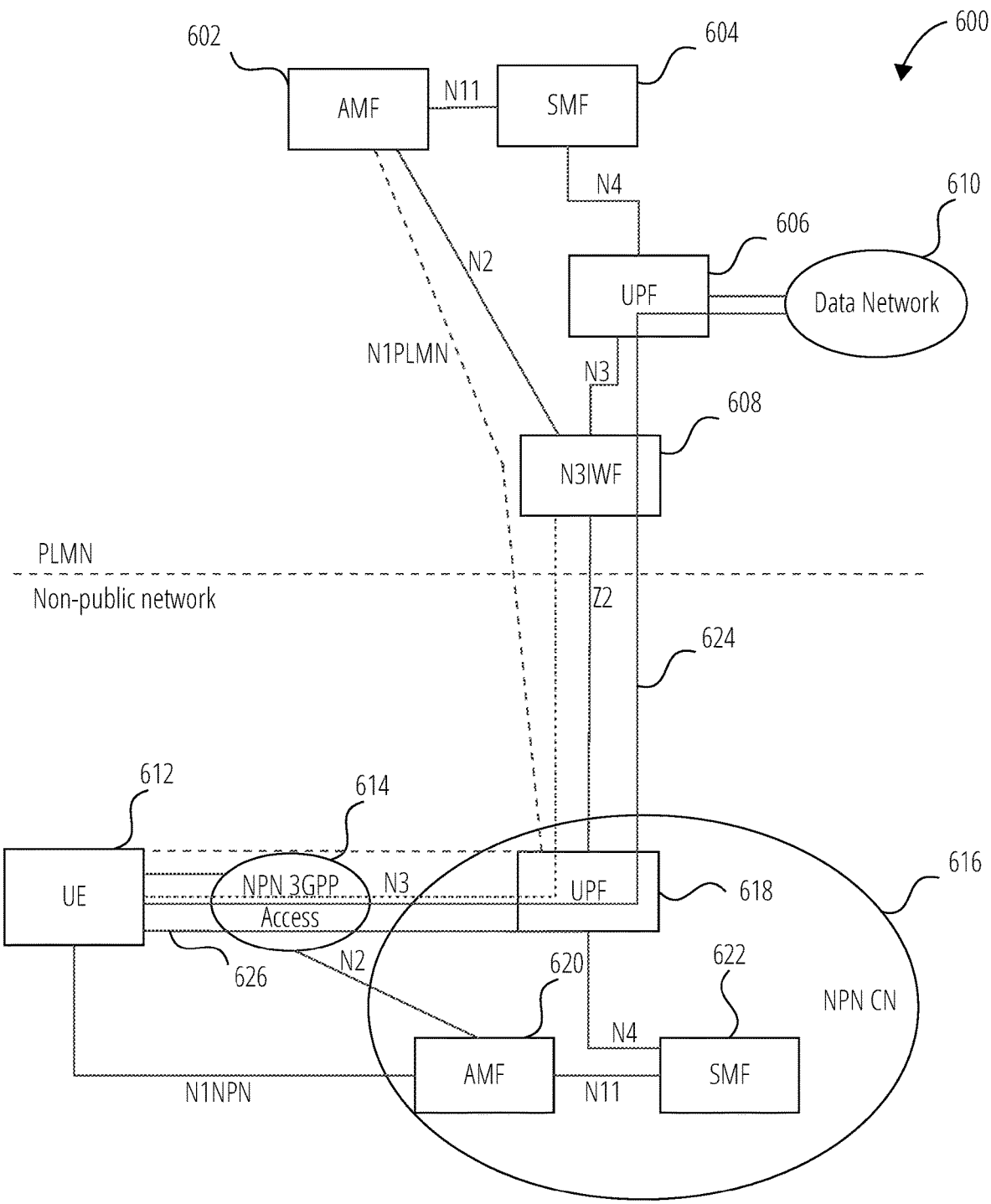
FIG. 6 illustrates an architecture in accordance with one embodiment.

For a non-public network, certain embodiments herein are based on concepts and an architecture to allow the UE to use PLMN service via accessing a non-public network. For example, FIG. 6 illustrates an architecture 600 to access PLMN services via a non-public network according to certain embodiments. See, for example, 3GPP TR 23.734, section 6.20. On a PLMN side, the architecture 600 includes an AMF 602, an SMF 604, a UPF 606, a non-3GPP interworking function (shown as N3IWF 608), and a data network 610. On a non-public network (NPN) side of the architecture 600 shown in FIG. 6, a UE 612, uses an NPN 3GPP access 614 to communicate with components in an NPN core network (CN) (shown as NPN CN 616), including a UPF 618, an AMF 620, and an SMF 622, an NPN CN 616. FIG. 6 shows links for PLMN PDU sessions 624 and NPN PDU sessions 626, as well as various reference points (N2, N3, N4, N1PLMN, Z2, N1NPN, and N11).

The NPN may be assumed to be based on the 5G system (5GS) architecture. The PLMN and the non-public network may deploy N3IWF functionality and configure the UE 612 to discover the respective N3IWFs. The UE 612 may discover the PLMN or non-public network N3IWF based on the configured information. The non-public network may configure the UE 612 with an internet protocol (IP) address or fully qualified domain name (FQDN) of the non-public network N3IWF, and the N3IWF selection configuration defined for the 5GS may not be required. The PLMN may configure the UE 612 to discover the PLMN N3IWF (i.e., N3IWF 608) based on 5GS mechanisms (e.g., for an N3IWF to be used for access from non-public networks, the configuration may be simply an IP address or FQDN). Whether a PLMN deploys separate N3IWF for access via non-public networks and non-3GPP access may be a deployment decision. For access to PLMN services via the non-public network, the UE 612 may obtain IP connectivity via the non-public network, may discover the N3IWF 608 provided by the PLMN, and may establish connectivity to the PLMN via the N3IWF 608. In this way, the N3IWF 608 may be registered at the same time with both the non-public network and the PLMN, including the scenario when NR is deployed in both the PLMN and the non-public network.

In one embodiment, the UE 612 obtains 5G core network (5GC) services offered by a PLMN via the non-public network. The UE 612 may first obtain IP connectivity by registering with the non-public network. Then, the 612 may obtain connectivity to the 5GC in the PLMN via the N3IWF. The non-public network may deploy a 3GPP RAT, though it is not considered a public PLMN. The UE 612 may perform PLMN selection as part of the N3IWF discovery as defined for untrusted non-3GPP access.

Figure 7:
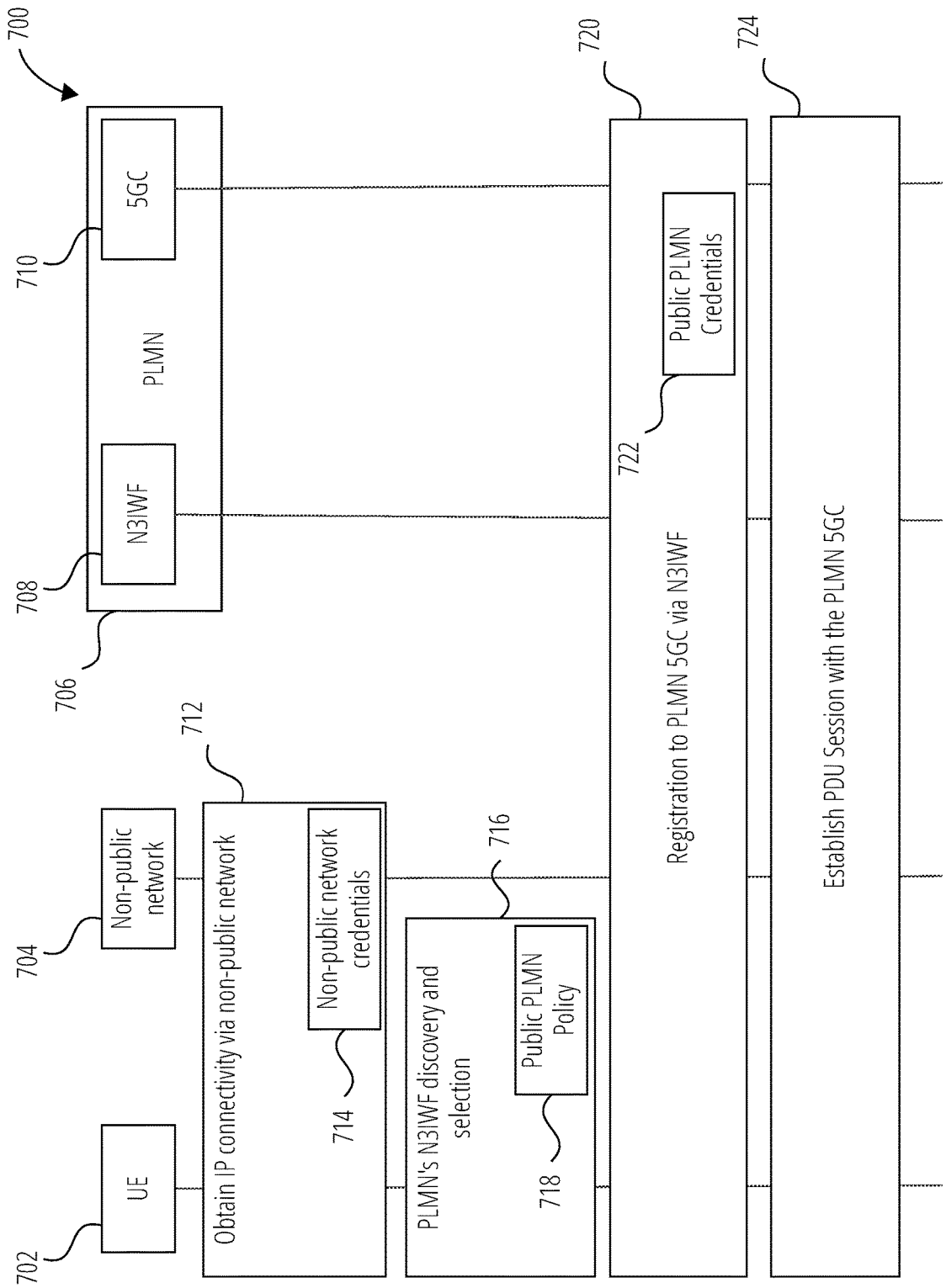
FIG. 7 illustrates a registration procedure in accordance with one embodiment.

FIG. 7 illustrates a registration procedure 700 that may be used, at least in part, according to certain embodiments. The registration procedure 700 may include interactions between a UE 702, a non-public network 704, and a PLMN 706. The PLMN 706 includes a N3IWF 708 and a 5GC 710. To register to public PLMN services via the non-public network 704, in a first process 712 the UE 702 discovers, selects, and connects to the non-public network 704 using Non-public network credentials 714. Thus, the UE 702 obtains IP connectivity.

In a second process 716, the UE 702 is provisioned with public PLMN policy 718 for N3IWF selection and discovers the N3IWF 708 using the mechanisms defined for untrusted non-3GPP access.

In a third process 720, the UE 702 registers with the 5GC 710 via the N3IWF 708 using public PLMN credentials 722 and using the registration procedure for untrusted non-3GPP access.

In a fourth process 724, the UE 702 establishes PDU session(s) with the public PLMN's 5GC 710 (or triggers the handover to the N3IWF 708.

In previous solutions (see, e.g., 3GPP TR 734 section 6.20), for some traffic, the UE 702 may require more privacy and does not want to expose sensitive data to traverse via PLMN 706. Also, the resultant latency may not be able to satisfy the latency requirement of some traffic. Thus, certain embodiments herein enable local breakout (e.g., either with a network based solution or a UE based solution) and/or provide a UE subscription and UE configuration. The embodiments may include variant steps based on available application identifiers (APP-IDs) at the network or the UE, available information of the DNN for a mobile network operator (MNO) PLMN, and/or the APP-IDs with the corresponding user preference of the latency, privacy, and the NPN or PLMN network.

1. Enabling Local Breakout (Network-Based)

Certain embodiments provide a network-based local breakout wherein authorized APP-IDs are stored at the network. In certain such embodiments, the NPN SMF adds a UL CL UPF based on matched DNN between the PLMN and the non-public network. Thus, the embodiments provide a method to perform local breakout at the non-public network for some traffic, and/or the criteria to determine if and when to enable local breakout.

Referring again to FIG. 7, certain embodiments perform the first process 712, the second process 716, and the third process 720 discussed above. Further, in the fourth process 724 for the PDU session establishment request procedure for 5GS PLMN service, the SMF determines to add a PDU session anchor (PSA) by using a UPF supporting UL CL (uplink classifier) functionality (see UPF 410 in FIG. 4) or Branching Point functionality (see UPF 502 in FIG. 5) to steer traffic that matches the configured traffic filters towards two selected UPFs (e.g., UPF 412 and DN UPF 414) supporting PDU session anchors (PSA) functionalities. In the examples shown in FIG. 4 and FIG. 5, the UPF 412 may be terminated at an N3IWF in the PLMN over an N6 interface (e.g., based on the route configuration provided by the SMF with the information of the N3IWF address), and the UPF 414 may be terminated locally (and may be referred to as a local UPF), to access the DN 416 over an N6 interface.

In an example embodiment, the SMF determines to add a PSA with local UPF for selected traffic in the PDU session based on information in the PDU session establishment request for 5GS PLMN. The information in the PDU session establishment request for 5GS PLMN may include one or more of: the requested DNN is also supported by the non-public network (i.e., DNN may be matched for the local breakout at NPN; the requested QoS required low latency that may not be supported to transport the traffic via the 5GS PLMN; the traffic identified by one or more APP-ID(s) to be transport via the requested PDU session uses privacy (e.g., a unified data management (UDM) and/or PCF may provide the information); the requested traffic identified by APP-ID requires higher throughput that may introduce more expenses (e.g., the UDM/PCF may provide the information); and/or the load of the UPF 412 needs to be offloaded locally. Further, the applicable privacy and QoS policy may be provided by the following options: UE subscription data; the UE may receive such privacy policy from the public network and/or non-public network after the successful authentication; an application protocol as part of the initiation and handshake may imbibe such policy in the UE; and/or an SMF of the non-public network may receive such policy by the UE for the user privacy preference and QoS/privacy settings of APP-ID(s) after successful authentication with public network and/or from the PCF for privacy/QoS requirements of all APP-ID(s).

In addition, or in another embodiment, the SMF provides two IP addresses (IPv6 prefix) or QoS flow IDs for two different QoS flows of the same PDU session to the PCF and the UE. For the traffic that is to be routed locally (local breakout), the corresponding list of application programming interfaces (APIs) is provided in a UE configuration update procedure including the mapping of QoS flow ID/IP address and corresponding API lists.

If user preferences are not known by the network, the UE routes traffic of applications via different QoS flow IDs based on received APP-IDs information from the UE configuration update or its user preferences of QoS (with low latency), privacy, or network preferences (for NPN). In this case, if using multiple IPv6 prefixes in a PDU session, the UPF supporting a Branching Point functionality may be configured by the SMF to spread the UL traffic between the IP anchors based on the source prefix of the PDU (which may be selected by the UE based on routing information and preferences received from the network).

In addition, or in other embodiments, the UE sends a notification to the non-public network SMF after successful authentication with the public network. If the NPN SMF does not add a UPF as PDU session anchor for local breakout in the PDU session establishment request procedure with MNO PLMN, the SMF may add the PDU session anchor for local breakout when receiving the notification or UE configuration update from the UE. In certain such embodiments, the notification information may indicate the activation of local breakout. With such notification, the SMF triggers the adding of PSA for local breakout.

In addition, or in other embodiments, the UE sends UE configuration update to the PCF via NPN SMF, wherein the UE configuration update includes the information of at least one of: user preferences of APP-IDs for privacy; QoS preference of APP-IDs for latency; and/or user preference of APP-IDs for NPN. The PCF may trigger the procedure to request NPN SMF for adding PSA for local breakout with a list of APP-IDs for local breakout.

In certain embodiments, the SMF configures the UL CL UPF with traffic filters accordingly, which may be corresponding to different QoS flow IDs or IP addresses for NPN and MNO PLMN. The UL CL may provide forwarding of UL traffic towards different PDU session anchors and merge of DL traffic to the UE (i.e., merging the traffic from the different PDU session anchors on the link towards the UE), which may be based on traffic detection and traffic forwarding rules provided by the SMF. The UL CL may apply filtering rules (e.g., to examine the destination IP address/prefix of UL IP packets sent by the UE) and may determine how the packet should be routed. The UPF supporting an UL CL may also be controlled by the SMF to support traffic measurement for charging, traffic replication for LI and bit rate enforcement (session-AMBR per PDU session). In such embodiments, the UE may be transparent for the UL CL and it is up to the UL CL to steer the traffic based on the configuration provided by the NPN SMF.

2. Enabling Local Breakout (UE-Based)

Certain embodiments provide UE-based local breakout wherein an APP-ID list is configured locally at the UE. The NPN SMF adds the UL CL UPF based on local policy (e.g., in second process 716 of FIG. 7) or the UE updates information to the NPN SPF based on matched DNN (e.g., in fourth process 724 of FIG. 7).

A method includes the UE performing the first process 712, the second process 716, the third process 720, and the fourth process 724 discussed above in relation to FIG. 7 for registration to 5GC for MNO PLMN services over the non-public network via N3IWF.

After successful authentication with the public network via information sent from N3IWF, based on the received policy, which may contain the local operator's policy for local breakout for the MNO PLMN from the NPN PCF, the NPN SMF determines to instantiate to use UL CL UPF to add a PDU session anchor with two UPFs anchor points terminated to different networks, including one for the nonpublic network and one for the PLMN (public network). The operator may be a third party or MNO (e.g., for the MNO's own non-public network).

Then, the UE may securely receive an updated list of DNN from the public network after authentication with the public network, wherein the UE maintains an applicable privacy policy for application enabled for a local breakout and is pre-configured or updated dynamically from the public network for an updated list of DNN.

The UE then sends a notification to non-public network SMF after successful authentication with the public network, wherein the notification contains the DNN of the established PDU session and optionally the list of DNNs for public network. If the NPN SMF does not configure a UL CL UPF for local breakout in the process above, the NPN SMF may determine to instantiate to use UL CL UPF to add a PDU session anchor with two UPF anchor points terminated to different networks, including one for nonpublic network and one for the PLMN (public network).

If the UE's non-public network profile includes the same DNN of the established MNO PDU session, the UE continues by updating the UE configuration with routing information for the local breakout to the PCF/SMF for its user preference setting of privacy, QoS, and NPN preference for applications identified by application-ID. If needed, the SMF configures the UL CL UPF accordingly with the traffic filters and provide updates to the UE via UE configuration update procedure with QoS flow IDs with corresponding application IDs.

The UE may then decide to route application or QoS flows to the local breakout UPF or remote UPF based on the received policy or its user preference, whereby the received policy may be, for example, low latency for local breakout UPF.

The UL CL UPF based on configured traffic filters to route the traffic for local breakout UPF or for MNO PLMN.

3. UE Subscription and UE Configuration

Certain embodiments configure the UE to enable the local breakout at the non-public network. The embodiments may follow the method UE configuration update procedure 300 shown in FIG. 3 for transparent UE policy delivery to configure the UE configuration for the non-public network access profile, wherein the non-public network access profile includes at least one of the following information: the list of DNNs allowed for non-public network; the list of DNNs allowed for 5GS PLMN; and/or the list of APP-IDs with default settings for QoS (latency) and privacy.

Note that the embodiments described above for UE-based local breakout may also work where the DNN of both non-public and public network are the same. In case of different DNN, it may be possible that there lies a trust between non-public and public network. The UE may receive such DNN information from the public network after successful authentication or during the authentication process.

Example Systems and Apparatuses

Figure 8:
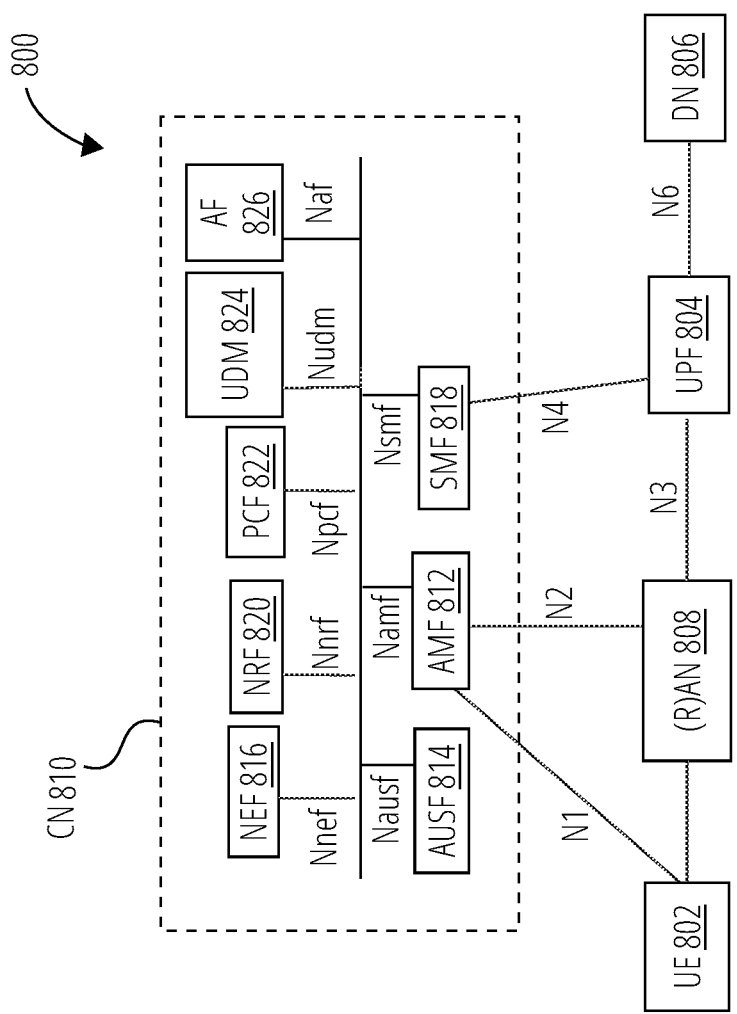
FIG. 8 illustrates a system in accordance with one embodiment.

FIG. 8 illustrates an architecture of a system 800 of a network in accordance with some embodiments. The system 800 is shown to include a UE 802; a 5G access node or RAN node (shown as (R)AN node 808); a User Plane Function (shown as UPF 804); a Data Network (DN 806), which may be, for example, operator services, Internet access or 3rd party services; and a 5G Core Network (5GC) (shown as CN 810).

The CN 810 may include an Authentication Server Function (AUSF 814); a Core Access and Mobility Management Function (AMF 812); a Session Management Function (SMF 818); a Network Exposure Function (NEF 816); a Policy Control Function (PCF 822); a Network Function (NF) Repository Function (NRF 820); a Unified Data Management (UDM 824); and an Application Function (AF 826). The CN 810 may also include other elements that are not shown, such as a Structured Data Storage network function (SDSF), an Unstructured Data Storage network function (UDSF), and the like.

The UPF 804 may act as an anchor point for intra-RAT and inter-RAT mobility, an external PDU session point of interconnect to DN 806, and a branching point to support multi-homed PDU session. The UPF 804 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 804 may include an uplink classifier to support routing traffic flows to a data network. The DN 806 may represent various network operator services, Internet access, or third party services.

The AUSF 814 may store data for authentication of UE 802 and handle authentication related functionality. The AUSF 814 may facilitate a common authentication framework for various access types.

The AMF 812 may be responsible for registration management (e.g., for registering UE 802, etc.), connection management, reachability management, mobility management, and lawful interception of AMF-related events, and access authentication and authorization. AMF 812 may provide transport for SM messages for the SMF 818, and act as a transparent proxy for routing SM messages. AMF 812 may also provide transport for short message service (SMS) messages between UE 802 and an SMS function (SMSF) (not shown by FIG. 8). AMF 812 may act as Security Anchor Function (SEA), which may include interaction with the AUSF 814 and the UE 802, receipt of an intermediate key that was established as a result of the UE 802 authentication process. Where USIM based authentication is used, the AMF 812 may retrieve the security material from the AUSF 814. AMF 812 may also include a Security Context Management (SCM) function, which receives a key from the SEA that it uses to derive access-network specific keys. Furthermore, AMF 812 may be a termination point of RAN CP interface (N2 reference point), a termination point of NAS (NI) signaling, and perform NAS ciphering and integrity protection.

AMF 812 may also support NAS signaling with a UE 802 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 802 and AMF 812, and relay uplink and downlink user-plane packets between the UE 802 and UPF 804. The N3IWF also provides mechanisms for IPsec tunnel establishment with the UE 802.

The SMF 818 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 818 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 816 may provide means for securely exposing the services and capabilities provided by 3GPP network functions for third party, internal exposure/re-exposure, Application Functions (e.g., AF 826), edge computing or fog computing systems, etc. In such embodiments, the NEF 816 may authenticate, authorize, and/or throttle the AFs. NEF 816 may also translate information exchanged with the AF 826 and information exchanged with internal network functions. For example, the NEF 816 may translate between an AF-Service-Identifier and an internal 5GC information. NEF 816 may also receive information from other network functions (NFs) based on exposed capabilities of other network functions. This information may be stored at the NEF 816 as structured data, or at a data storage NF using a standardized interfaces. The stored information can then be re-exposed by the NEF 816 to other NFs and AFs, and/or used for other purposes such as analytics.

The NRF 820 may support service discovery functions, receive NF Discovery Requests from NF instances, and provide the information of the discovered NF instances to the NF instances. NRF 820 also maintains information of available NF instances and their supported services.

The PCF 822 may provide policy rules to control plane function(s) to enforce them, and may also support unified policy framework to govern network behavior. The PCF 822 may also implement a front end (FE) to access subscription information relevant for policy decisions in a UDR of UDM 824.

The UDM 824 may handle subscription-related information to support the network entities' handling of communication sessions, and may store subscription data of UE 802. The UDM 824 may include two parts, an application FE and a User Data Repository (UDR). The UDM may include a UDM FE, which is in charge of processing of credentials, location management, subscription management, and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 822. UDM 824 may also support SMS management, wherein an SMS-FE implements the similar application logic as discussed previously.

The AF 826 may provide application influence on traffic routing, access to the Network Capability Exposure (NCE), and interact with the policy framework for policy control. The NCE may be a mechanism that allows the 5GC and AF 826 to provide information to each other via NEF 816, which may be used for edge computing implementations. In such implementations, the network operator and third party services may be hosted close to the UE 802 access point of attachment to achieve an efficient service delivery through the reduced end-to-end latency and load on the transport network. For edge computing implementations, the 5GC may select a UPF 804 close to the UE 802 and execute traffic steering from the UPF 804 to DN 806 via the N6 interface. This may be based on the UE subscription data, UE location, and information provided by the AF 826. In this way, the AF 826 may influence UPF (re)selection and traffic routing. Based on operator deployment, when AF 826 is considered to be a trusted entity, the network operator may permit AF 826 to interact directly with relevant NFs.

As discussed previously, the CN 810 may include an SMSF, which may be responsible for SMS subscription checking and verification, and relaying SM messages to/from the UE 802 to/from other entities, such as an SMS-GMSC/IWMSC/SMS-router. The SMS may also interact with AMF 812 and UDM 824 for notification procedure that the UE 802 is available for SMS transfer (e.g., set a UE not reachable flag, and notifying UDM 824 when UE 802 is available for SMS).

The system 800 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 800 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 810 may include an Nx interface, which is an inter-CN interface between the MME (e.g., MME(s) 1114) and the AMF 812 in order to enable interworking between CN 810 and CN 1106.

Although not shown by FIG. 8, the system 800 may include multiple RAN nodes (such as (R)AN node 808) wherein an Xn interface is defined between two or more (R)AN node 808 (e.g., gNBs and the like) that connecting to 5GC 410, between a (R)AN node 808 (e.g., gNB) connecting to CN 810 and an eNB, and/or between two eNB s connecting to CN 810.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 802 in a connected mode (e.g., CM-CONNECTED) including functionality to manage the UE mobility for connected mode between one or more (R)AN node 808. The mobility support may include context transfer from an old (source) serving (R)AN node 808 to new (target) serving (R)AN node 808; and control of user plane tunnels between old (source) serving (R)AN node 808 to new (target) serving (R)AN node 808.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 9:
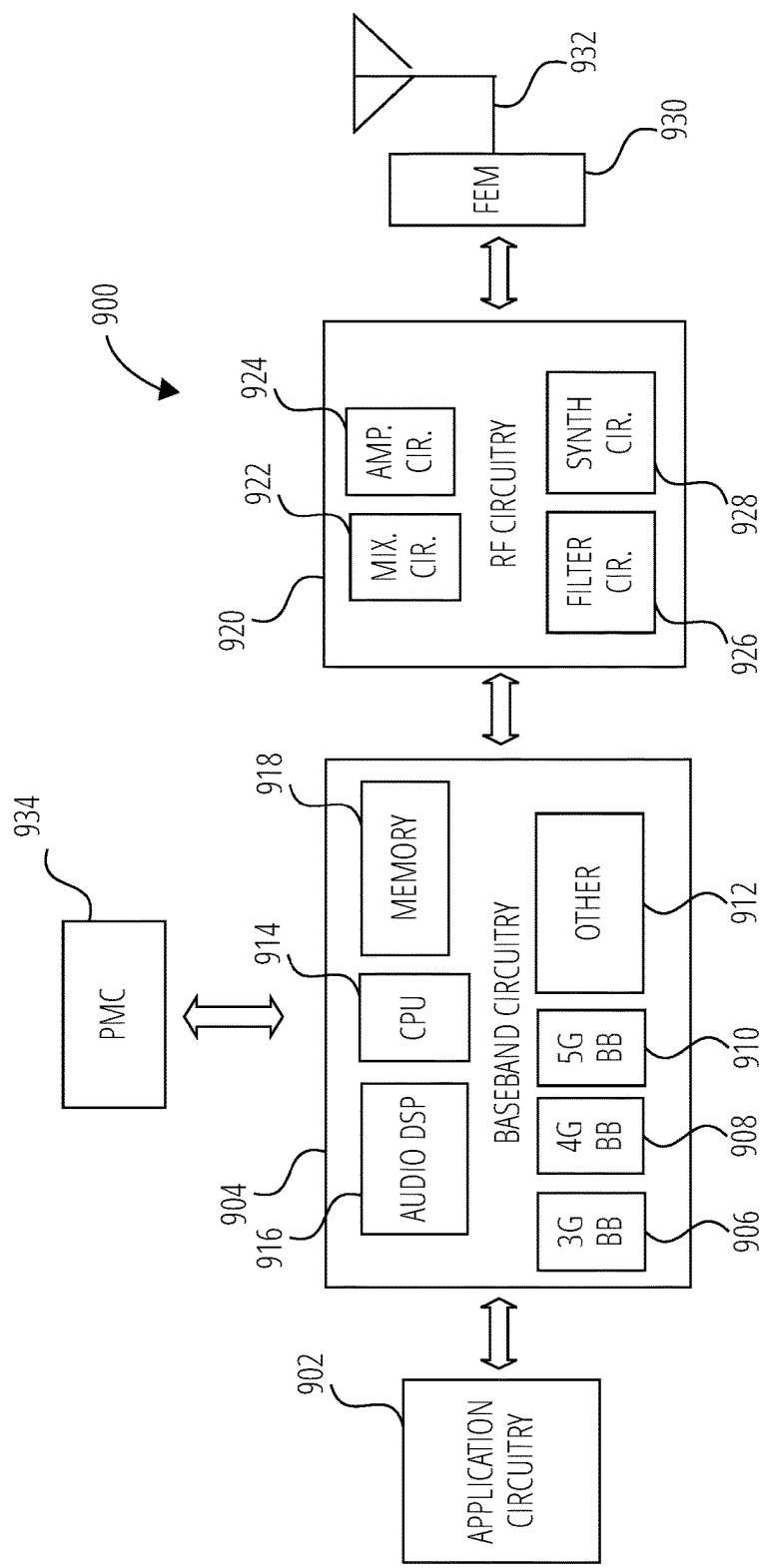
FIG. 9 illustrates a device in accordance with one embodiment.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing Unit (CPU 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may comprise passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional-N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer comprising a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in a UE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
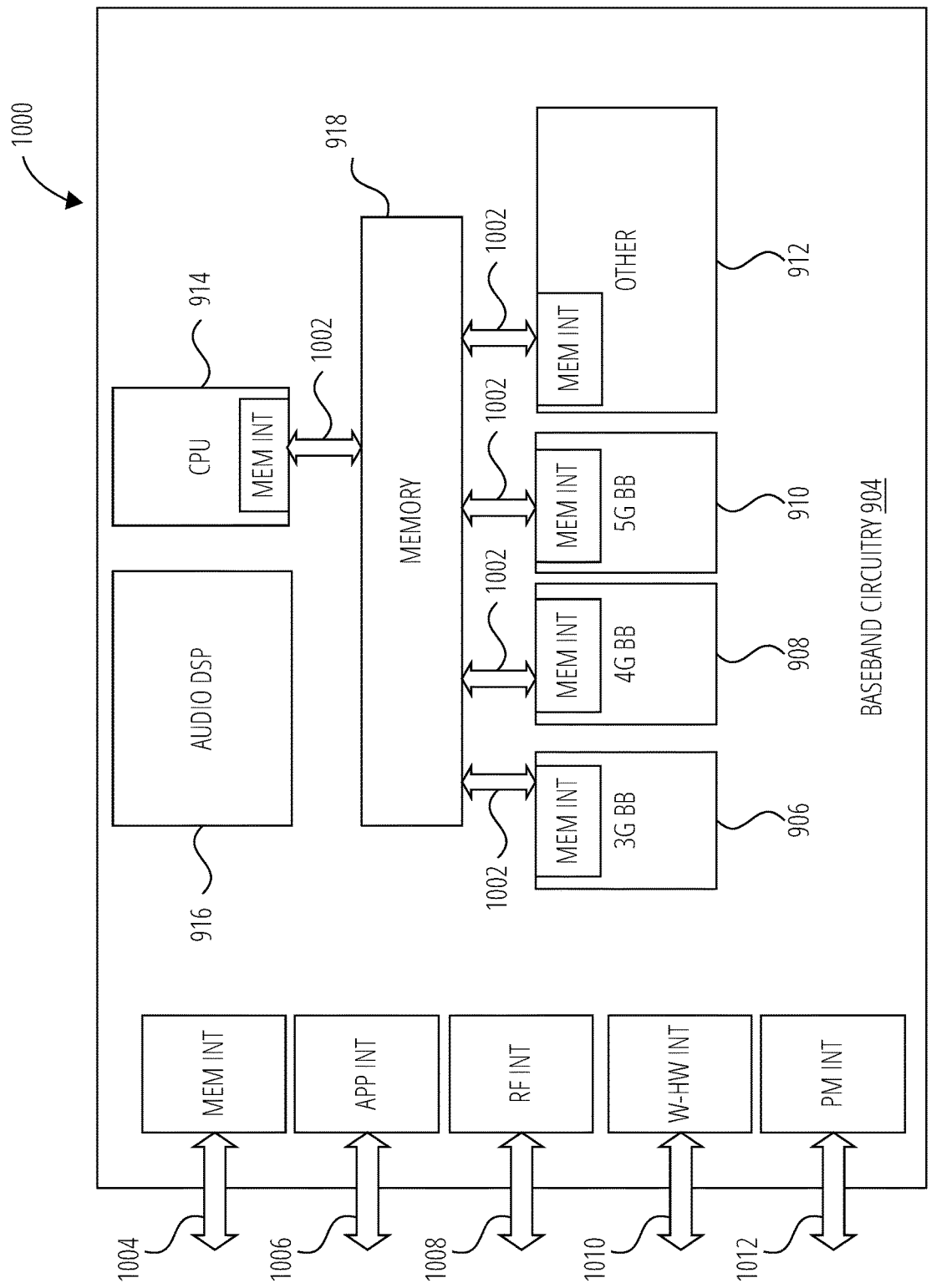
FIG. 10 illustrates example interfaces in accordance with one embodiment.

FIG. 10 illustrates example interfaces 1000 of baseband circuitry in accordance with some embodiments. As discussed above, the baseband circuitry 904 of FIG. 9 may comprise 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
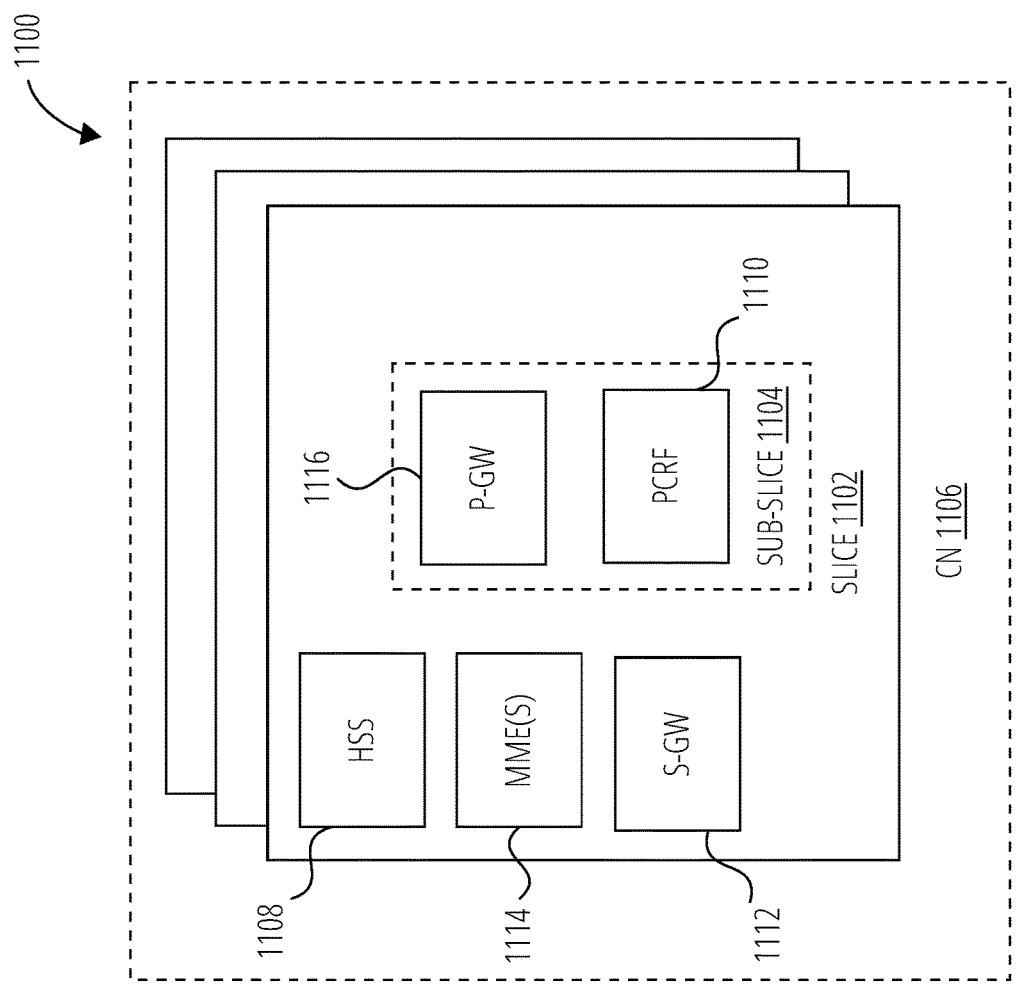
FIG. 11 illustrates components in accordance with one embodiment.

FIG. 11 illustrates components 1100 of a core network in accordance with some embodiments. The components of the CN 1106 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 1106 may be referred to as a network slice 1102 (e.g., the network slice 1102 is shown to include the HSS 1108, the MME(s) 1114, and the S-GW 1112). A logical instantiation of a portion of the CN 1106 may be referred to as a network sub-slice 1104 (e.g., the network sub-slice 1104 is shown to include the P-GW 1116 and the PCRF 1110).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 12:
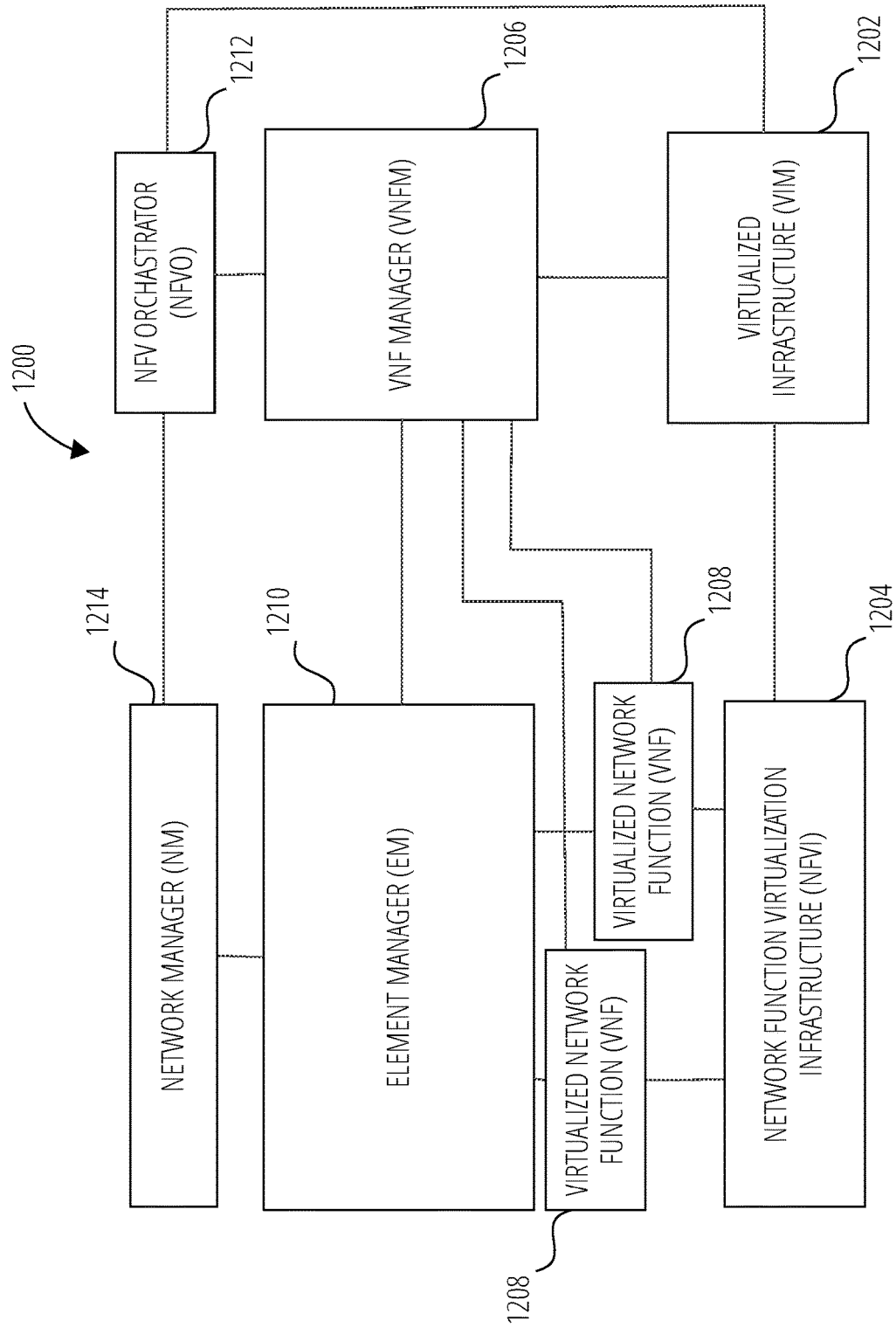
FIG. 12 illustrates a system in accordance with one embodiment.

FIG. 12 is a block diagram illustrating components, according to some example embodiments, of a system 1200 to support NFV. The system 1200 is illustrated as including a virtualized infrastructure manager (shown as VIM 1202), a network function virtualization infrastructure (shown as NFVI 1204), a VNF manager (shown as VNFM 1206), virtualized network functions (shown as VNF 1208), an element manager (shown as EM 1210), an NFV Orchestrator (shown as NFVO 1212), and a network manager (shown as NM 1214).

The VIM 1202 manages the resources of the NFVI 1204. The NFVI 1204 can include physical or virtual resources and applications (including hypervisors) used to execute the system 1200. The VIM 1202 may manage the life cycle of virtual resources with the NFVI 1204 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1206 may manage the VNF 1208. The VNF 1208 may be used to execute EPC components/functions. The VNFM 1206 may manage the life cycle of the VNF 1208 and track performance, fault and security of the virtual aspects of VNF 1208. The EM 1210 may track the performance, fault and security of the functional aspects of VNF 1208. The tracking data from the VNFM 1206 and the EM 1210 may comprise, for example, performance measurement (PM) data used by the VIM 1202 or the NFVI 1204. Both the VNFM 1206 and the EM 1210 can scale up/down the quantity of VNFs of the system 1200.

The NFVO 1212 may coordinate, authorize, release and engage resources of the NFVI 1204 in order to provide the requested service (e.g., to execute an EPC function, component, or slice). The NM 1214 may provide a package of end-user functions with the responsibility for the management of a network, which may include network elements with VNFs, non-virtualized network functions, or both (management of the VNFs may occur via the EM 1210).

Figure 13:
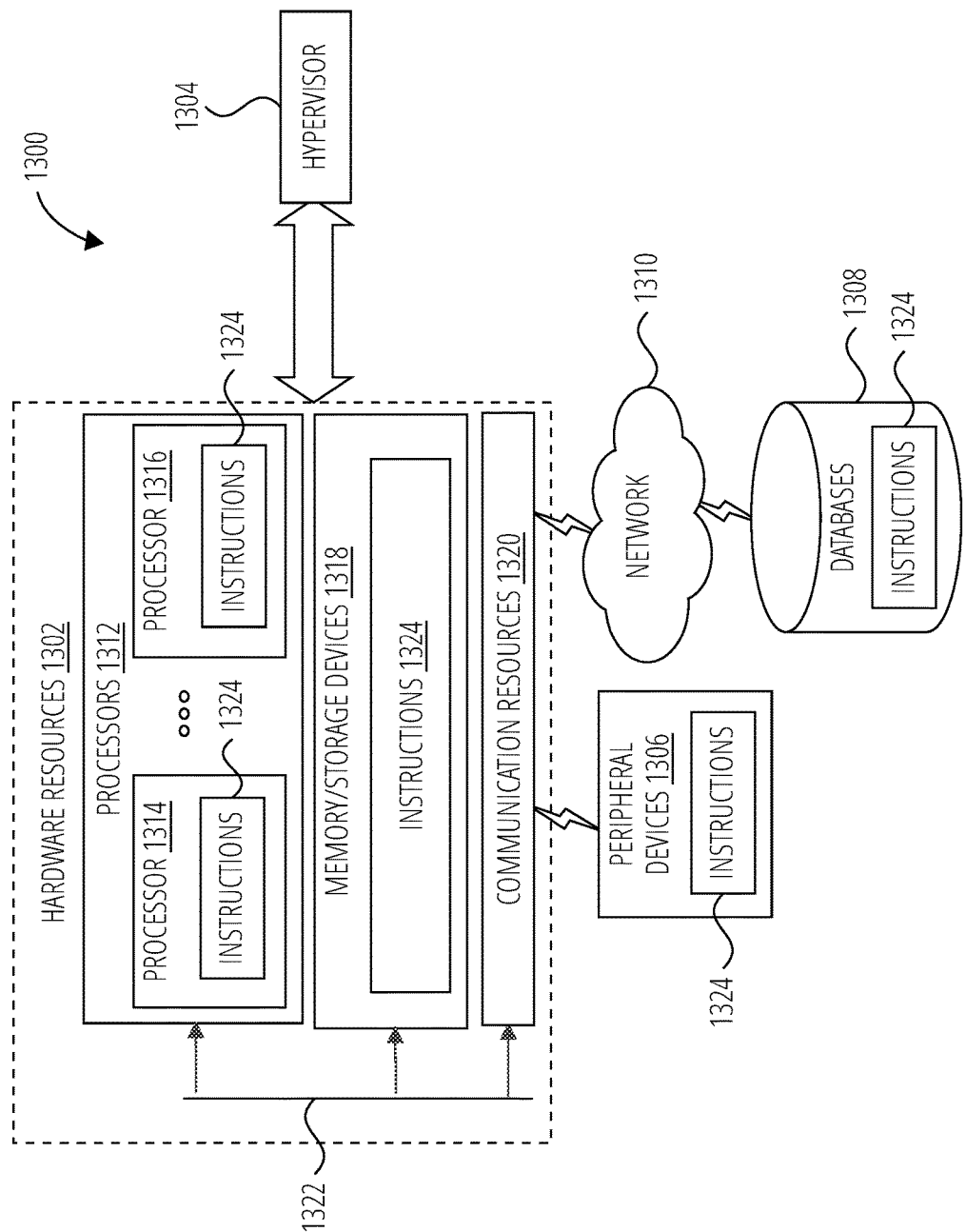
FIG. 13 illustrates components in accordance with one embodiment.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1302 including one or more processors 1312 (or processor cores), one or more memory/storage devices 1318, and one or more communication resources 1320, each of which may be communicatively coupled via a bus 1322. For embodiments where node virtualization (e.g., NFV) is utilized, a hypervisor 1304 may be executed to provide an execution environment for one or more network slices/sub-slices to utilize the hardware resources 1302.

The processors 1312 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1314 and a processor 1316.

The memory/storage devices 1318 may include main memory, disk storage, or any suitable combination thereof. The memory/storage devices 1318 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1320 may include interconnection or network interface components or other suitable devices to communicate with one or more peripheral devices 1306 or one or more databases 1308 via a network 1310. For example, the communication resources 1320 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1324 may comprise software, a program, an application, an applet, an app, or other executable code for causing at least any of the processors 1312 to perform any one or more of the methodologies discussed herein. The instructions 1324 may reside, completely or partially, within at least one of the processors 1312 (e.g., within the processor's cache memory), the memory/storage devices 1318, or any suitable combination thereof. Furthermore, any portion of the instructions 1324 may be transferred to the hardware resources 1302 from any combination of the peripheral devices 1306 or the databases 1308. Accordingly, the memory of the processors 1312, the memory/storage devices 1318, the peripheral devices 1306, and the databases 1308 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a non-transitory computer-readable storage medium. The computer-readable storage medium includes instructions that when executed by a processor of a session management function (SMF) in a core network of a wireless cellular network, cause the processor to perform local breakout for selected traffic. The instructions cause the processor to: process a protocol data unit (PDU) session establishment request to establish a PDU session for a user equipment (UE) registered to public land mobile network (PLMN) services of a mobile network operator (MNO) via a non-public network; determine, from the PDU session establishment request, information including a requested data network name (DNN), a requested quality of service (QoS), one or more application identifiers (App-IDs), requested traffic associated with the one or more App-IDs, and an indication that a load of a first PDU session anchor (PSA) in a first user plane function (UPF) is to be offloaded locally; and determine whether to add a second PSA in a second UPF to steer the selected traffic in the PDU session based on the information in the PDU session establishment procedure.

Example 2 is the computer-readable storage medium of Example 1, wherein determining to add the second PSA is based on one or more of: the requested DNN is matched for the local breakout at the non-public network; the requested QoS is associated with a latency that is lower than that supported to transport the requested traffic via a PLMN of the MNO; the requested traffic identified by the one or more App-IDs to be transported via PDU session includes a privacy requirement; the requested traffic identified by the one or more App-ID uses a high throughput that may introduce additional expenses; and the indication that the load of the first PSA in the first UPF is to be offloaded locally.

Example 3 is the computer-readable storage medium of Example 2, wherein the first UPF is terminated at a non-3GPP inter-work function (N3IWF) in the PLMN over an N6 interface, and wherein the local UPF is terminated locally to access a data network (DN) over the N6 interface.

Example 4 is the computer-readable storage medium of Example 3, wherein the instructions further configure the computer to receive privacy and QoS policy information from at least one of: the UE for a user privacy preference and QoS or privacy settings of the one or more App-IDs after successful authentication with a public network; and a policy control function (PCF) for privacy or QoS settings of a group of App-IDs including the one or more App-IDs.

Example 5 is the computer-readable storage medium of Example 1, wherein the SMF is a non-public network SMF, and wherein the SMF determines to add the second PSA in the second UPF, wherein the instructions further cause the processor to receive, from the UE after successful authentication to a public network, a notification to enforce a policy for the local breakout for selected APP-ID settings, wherein the notification comprises a message from the UE or a UE configuration update message.

Example 6 is the computer-readable storage medium of Example 5, wherein the instructions further cause the processor to, in response to the notification from the UE, trigger addition of the second PSA in the second UPF for steering the traffic in a local breakout network.

Example 7 is the computer-readable storage medium of Example 6, wherein the SMF configures a local UPF support uplink classifier (UL CL) functionality or branching point functionality to steer the selected traffic that matches configured traffic filters to the first UPF and the second UPF.

Example 8 is the computer-readable storage medium of Example 7, wherein the instructions further cause the processor to, for a local UPF support the branching point functionality, provide two internet protocol (IP) addresses to the UE for steering two different QoS flows of the PDU session.

Example 9 is the computer-readable storage medium of Example 8, wherein the instructions further cause the processor to, for a locally routed QoS flow of the two different QoS flows, obtain policies from a policy control function and provides a corresponding list of application identifiers (APP-IDs) in a UE configuration update procedure including a mapping of the IP address and the corresponding list of APP-IDs.

Example 10 is the computer-readable storage medium of Example 9, wherein the UE configuration update procedure provides transparent UE policy delivery to configure the UE for a non-public network access profile comprising a list of DNNs allowed for PLMN, and a list of APP-IDs that require privacy and is disallowed to be transported via the PLMN.

Example 11 is the computer-readable storage medium of Example 7, wherein the instructions further cause the processor to, for a local UPF support the UL CL functionality, provide two QoS flow IDs to the local UPF supporting the UL CL for two different QoS flows of the PDU session.

Example 12 is the computer-readable storage medium of Example 11, wherein the instructions further configure the computer to, for a locally routed QoS flow of the two different QoS flows, obtain a corresponding list of application identifiers (APP-IDs) from a policy control function (PCF) including a mapping of the corresponding IP address and the corresponding list of APIs.

Example 13 is the computer-readable storage medium of Example 12, wherein the PCF provides information to configure the local UPF support the UL CL comprising at least one of a first list of DNNs allowed for the non-public network, a second list of DNNs allowed for a PLMN, and a list of APP-IDs with default settings for QoS and privacy.

Example 14 is the computer-readable storage medium of Example 11, wherein the instructions further cause the processor to configure the local UPF supporting UL CL functionality with traffic filters to the two QoS flow IDs selectively directing traffic to the non-public network and the PLMN.

Example 15 is the computer-readable storage medium of Example 14, wherein the instructions further cause the processor to provide traffic detection and traffic forwarding rules to the local UPF supporting UL CL functionality to configure the local UPF to forward uplink traffic to the first PSA and the second PSA and merge downlink traffic to the UE from the first PSA and the second PSA.

Example 16 is the computer-readable storage medium of Example 15, wherein the instructions further cause the processor to control the local UPF supporting UL CL functionality to support at least one of traffic measurement for charging, traffic replication for lawful intercept (LI), and bit rate enforcement.

Example 17 is an apparatus for a user equipment (UE). The apparatus includes a memory interface and a processor. The memory interface is to send or receive, to or from a memory device, data corresponding to a UE configuration update. The processor is to: after successful authentication with a public network, send the UE configuration update to a policy control function (PCF) via a non-public network (NPN) session management function (SMF), the UE configuration update comprising: user preferences of application identifiers (App-IDs) for privacy; a quality of service (QoS) preference of the App-IDs for latency; and a user preference of the App-IDs for the NPN; and route uplink traffic between two anchor points for two different QoS flows of a same protocol data unit (PDU) session.

Example 18 is the apparatus of Example 17, wherein the UE configuration update comprises an indication of a local breakout.

Example 19 is the apparatus of Example 17, wherein the processor is further configured to receive, from the NPN SMF, two internet protocol (IP) addresses for the two different QoS flows of the same PDU session.

Example 20 is the apparatus of Example 19, wherein the processor is further configured to select source prefixes of a plurality of PDUs in the PDU session to steer the uplink traffic toward the two anchor points.

Example 21 is the apparatus of Example 20, wherein a local user plane function (UPF) supporting branching point functionality, based on received information of the UE configuration update from the UE, receives the traffic, provides traffic detection, forwards uplink traffic to the to the two anchor points, and merges downlink traffic to the UE from the two anchor points.

Example 22 is a method for user equipment (UE). The method includes: after successful authentication with a public network, receiving a UE configuration update from a policy control function (PCF) via a non-public network (NPN) session management function (SMF), the UE configuration update comprising at least one of: operator configured application identifiers (App-IDs) for privacy; operator configured quality of service (QoS) of the App-IDs for latency; and operator configured App-IDs for the NPN; and routing uplink traffic toward two anchor points for two different QoS flows of a same protocol data unit (PDU) session.

Example 23 is the method of Example 22, further comprising receiving, from the NPN SMF, two QoS flow IDs for the two different QoS flows of the same PDU session.

Example 24 is the method of Example 23, further comprising routing traffic of applications via the two QoS flow IDs based on receive App-IDs information in a UE configuration update procedure.

Example 25 is the method of Example 24, further comprising routing traffic of applications via the two QoS flow IDs based on at least one of the user preferences and operator configuration for the App-IDs for privacy, the QoS preference and operator configuration of the App-IDs for latency, and the user preference and operator configuration of the App-IDs for the NPN.

Example 26 is the method of Example 22, further comprising, after the successful authentication with the public network, securely receiving an updated list of data network names (DNNs) from the public network.

Example 27 is the method of Example 26, wherein the UE maintains an applicable privacy policy for an application enabled for a local breakout and is preconfigured or updated dynamically from the public network for the updated list of DNNs.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for a user equipment (UE), the apparatus comprising:
   a memory interface to send or receive, to or from a memory device, data corresponding to a UE configuration update; and
   a processor to:
     after successful authentication with a public network, send the UE configuration update to a policy control function (PCF) via a non-public network (NPN) session management function (SMF), the UE configuration update comprising:
       first user preferences of application identifiers (App-IDs) for privacy;
       a quality of service (QoS) preference of the App-IDs for latency; and
       second user preferences of the App-IDs for an NPN corresponding to the NPN SMF; and
     route uplink traffic between two anchor points for two different QoS flows of a same protocol data unit (PDU) session.

2. The apparatus of claim 1, wherein the UE configuration update comprises an indication of a local breakout.

3. The apparatus of claim 1, wherein the processor is further configured to receive, from the NPN SMF, two internet protocol (IP) addresses for the two different QoS flows of the same PDU session.

4. The apparatus of claim 3, wherein the processor is further configured to select source prefixes of a plurality of PDUs in the PDU session to steer the uplink traffic toward the two anchor points.

5. The apparatus of claim 4, wherein a local user plane function (UPF) supporting branching point functionality, based on received information of the UE configuration update from the UE, receives the traffic and provides traffic detection.

6. The apparatus of claim 5, wherein the local UPF supporting the branching point functionality, based on the received information of the UE configuration update from the UE, further forwards uplink traffic to the to the two anchor points.

7. The apparatus of claim 6, wherein the local UPF supporting the branching point functionality, based on the received information of the UE configuration update from the UE, further merges downlink traffic to the UE from the two anchor points.

8. A method of a user equipment (UE), the method comprising:
   after successful authentication with a public network, receiving a UE configuration update from a policy control function (PCF) via a non-public network (NPN) session management function (SMF), the UE configuration update comprising at least one of:
   operator configured application identifiers (App-IDs) for privacy;
   operator configured quality of service (QoS) of the App-IDs for latency; and
   operator configured App-IDs for an NPN corresponding to the NPN SMF; and
   routing uplink traffic toward two anchor points for two different QoS flows of a same protocol data unit (PDU) session.

9. The method of claim 8, further comprising receiving, from the NPN SMF, two QoS flow IDs for the two different QoS flows of the same PDU session.

10. The method of claim 9, further comprising routing traffic of applications via the two QoS flow IDs based on receive App-IDs information in a UE configuration update procedure.

11. The method of claim 8, further comprising, after the successful authentication with the public network, securely receiving an updated list of data network names (DNNs) from the public network.

12. The method of claim 11, wherein the UE maintains an applicable privacy policy for an application enabled for a local breakout and is preconfigured or updated dynamically from the public network for the updated list of DNNs.

13. A non-transitory computer-readable storage medium of a user equipment (UE), the computer-readable storage medium having computer-readable instructions stored thereon, the computer readable instructions configured to instruct one or more processors of the UE to:
   after successful authentication with a public network, send a UE configuration update to a policy control function (PCF) via a non-public network (NPN) session management function (SMF), the UE configuration update comprising:
     first user preferences of application identifiers (App-IDs) for privacy;
     a quality of service (QoS) preference of the App-IDs for latency; and
     second user preferences of the App-IDs for an NPN corresponding to the NPN SMF; and
   route uplink traffic between two anchor points for two different QoS flows of a same protocol data unit (PDU) session.

14. The non-transitory computer-readable storage medium of claim 13, wherein the UE configuration update comprises an indication of a local breakout.

15. The non-transitory computer-readable storage medium of claim 13, wherein the computer-readable instructions are further configured to receive, from the NPN SMF, two internet protocol (IP) addresses for the two different QoS flows of the same PDU session.

16. The non-transitory computer-readable storage medium of claim 15, wherein the computer-readable instructions are further configured to select source prefixes of a plurality of PDUs in the PDU session to steer the uplink traffic toward the two anchor points.

17. The non-transitory computer-readable storage medium of claim 16, wherein a local user plane function (UPF) supporting branching point functionality, based on received information of the UE configuration update from the UE, receives the traffic and provides traffic detection.

18. The non-transitory computer-readable storage medium of claim 17, wherein the local UPF supporting the branching point functionality, based on the received information of the UE configuration update from the UE, further forwards uplink traffic to the to the two anchor points.

19. The non-transitory computer-readable storage medium of claim 18, wherein the local UPF supporting the branching point functionality, based on the received information of the UE configuration update from the UE, further merges downlink traffic to the UE from the two anchor points.

\* \* \* \* \*